US010993160B2

(12) United States Patent
Mackenzie et al.

(10) Patent No.: US 10,993,160 B2
(45) Date of Patent: Apr. 27, 2021

(54) CELLULAR TELECOMMUNICATIONS NETWORK

(71) Applicant: BRITISH TELECOMMUNICATIONS PUBLIC LIMITED COMPANY, London (GB)

(72) Inventors: Richard Mackenzie, London (GB); Anvar Tukmanov, London (GB); Michael Fitch, London (GB); Keith Briggs, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/644,704

(22) PCT Filed: Jul. 27, 2018

(86) PCT No.: PCT/EP2018/070486
§ 371 (c)(1),
(2) Date: Mar. 5, 2020

(87) PCT Pub. No.: WO2019/048135
PCT Pub. Date: Mar. 14, 2019

(65) Prior Publication Data
US 2020/0288372 A1    Sep. 10, 2020

(30) Foreign Application Priority Data
Sep. 5, 2017    (EP) .................... 17189459

(51) Int. Cl.
*H04W 36/32*    (2009.01)
*H04W 36/00*    (2009.01)
(Continued)

(52) U.S. Cl.
CPC ....... *H04W 36/32* (2013.01); *H04W 36/0083* (2013.01); *H04W 36/026* (2013.01);
(Continued)

(58) Field of Classification Search
CPC ........... H04W 36/0083; H04W 36/026; H04W 36/08; H04W 36/30; H04W 36/32; H04W 84/005
(Continued)

(56) References Cited

U.S. PATENT DOCUMENTS 4,842,221 A    6/1989  Beach et al.
6,325,330 B1   12/2001 Lavan, Jr.
(Continued)

FOREIGN PATENT DOCUMENTS

CN    105083520 A    11/2015
EP      2485516 A1     8/2012
(Continued)

OTHER PUBLICATIONS

3GPP TS 36.423 v12.1.0 (Mar. 2014), "Evolved Universal Terrestrial Radio Access Network (E-UTRAN), X2 application protocol (X2AP)," Technical Specification, 3rd Generation Partnership Project, Technical Specification Group Radio Access Network, (Release 12), 144 pages.
(Continued)

*Primary Examiner* — Joel Ajayi
(74) *Attorney, Agent, or Firm* — Patterson Thuente Pedersen, P.A.

(57) ABSTRACT

There is provided a method, and a network node for implementing the method, in a cellular telecommunications network. The cellular telecommunications network includes a first and second base station, the first base station having a first interface for communicating with a first cellular core networking node and a second interface for wirelessly communicating with the second base station, the second base station being mobile and having a first interface for wirelessly communicating with the first base station and a second interface for communicating with a User Equipment
(Continued)

(UE), wherein the UE's user traffic is transmitted between the first cellular core networking node and the UE via the first and second base stations.

13 Claims, 7 Drawing Sheets

(51) Int. Cl.
  *H04W 36/02* (2009.01)
  *H04W 36/08* (2009.01)
  *H04W 36/30* (2009.01)
  *H04W 84/00* (2009.01)

(52) U.S. Cl.
  CPC .......... *H04W 36/08* (2013.01); *H04W 36/30* (2013.01); *H04W 84/005* (2013.01)

(58) Field of Classification Search
  USPC ....................................................... 455/436
  See application file for complete search history.

(56) References Cited

U.S. PATENT DOCUMENTS

| | | |
|---|---|---|
| 8,068,937 B2 | 11/2011 | Eaves |
| 8,781,637 B2 | 7/2014 | Eaves |
| 9,184,795 B2 | 11/2015 | Eaves |
| 9,432,929 B1 | 8/2016 | Ross et al. |
| 2005/0227696 A1 | 10/2005 | Kaplan et al. |
| 2006/0164318 A1 | 7/2006 | Lastinger et al. |
| 2007/0200027 A1 | 8/2007 | Johnson |
| 2008/0002626 A1 | 1/2008 | Yokoyama |
| 2009/0204268 A1 | 8/2009 | Eaves |
| 2010/0210268 A1 | 8/2010 | Lim et al. |
| 2011/0176509 A1 | 7/2011 | Hole et al. |
| 2011/0244863 A1 | 10/2011 | Matsuo et al. |
| 2012/0075759 A1 | 3/2012 | Eaves |
| 2012/0155377 A1 | 6/2012 | Chai |
| 2012/0225628 A1 | 9/2012 | Ho et al. |
| 2012/0252453 A1 | 10/2012 | Nagaraja et al. |
| 2013/0084884 A1 | 4/2013 | Teyeb et al. |
| 2013/0103220 A1 | 4/2013 | Eaves |
| 2013/0155959 A1 | 6/2013 | Ikeda et al. |
| 2013/0183971 A1 | 7/2013 | Tamaki et al. |
| 2013/0337811 A1 | 12/2013 | Faerber et al. |
| 2014/0099881 A1 | 4/2014 | Boudreau et al. |
| 2014/0162653 A1 | 6/2014 | Lee et al. |
| 2014/0233412 A1 | 8/2014 | Mishra et al. |
| 2014/0274064 A1 | 9/2014 | Al-Shalash et al. |
| 2014/0328190 A1 | 11/2014 | Lord et al. |
| 2015/0036663 A1 | 2/2015 | Kilpatrick, II et al. |
| 2015/0131618 A1 | 5/2015 | Chen |
| 2015/0181480 A1 | 6/2015 | Bulakci et al. |
| 2015/0215001 A1 | 7/2015 | Eaves |
| 2016/0046387 A1 | 2/2016 | Frolov et al. |
| 2016/0111877 A1 | 4/2016 | Eaves et al. |
| 2016/0134331 A1 | 5/2016 | Eaves |
| 2016/0142944 A1 | 5/2016 | Cao |
| 2016/0191142 A1 | 6/2016 | Boss et al. |
| 2016/0363457 A1 | 12/2016 | Jelavic et al. |
| 2017/0105172 A1 | 4/2017 | Wilhelmsson et al. |
| 2017/0237513 A1 | 8/2017 | Hahn et al. |
| 2018/0077518 A1 | 3/2018 | Nguyen et al. |

FOREIGN PATENT DOCUMENTS

| | | |
|---|---|---|
| EP | 2618601 A1 | 7/2013 |
| EP | 2938117 A1 | 10/2015 |
| EP | 2947915 A1 | 11/2015 |
| EP | 3062559 A1 | 8/2016 |
| GB | 2475851 A | 6/2011 |
| GB | 2503942 A | 1/2014 |
| GB | 2532966 A | 6/2016 |
| JP | 2015233324 A | 12/2015 |
| WO | WO-0201756 A1 | 1/2002 |
| WO | WO-02061971 A1 | 8/2002 |
| WO | WO-2009005875 A2 | 1/2009 |
| WO | WO-2011092698 A1 | 8/2011 |
| WO | WO-2012089237 A1 | 7/2012 |
| WO | WO-2012158085 A1 | 11/2012 |
| WO | WO-2013023171 A1 | 2/2013 |
| WO | WO-2013109008 A1 | 7/2013 |
| WO | WO-2013143084 A1 | 10/2013 |
| WO | WO-2014007687 A1 | 1/2014 |
| WO | WO-2014089051 A1 | 6/2014 |
| WO | WO-2014089329 A2 | 6/2014 |
| WO | WO-2015139733 A1 | 9/2015 |
| WO | WO-2015175725 A1 | 11/2015 |
| WO | WO-2016012055 A1 | 1/2016 |
| WO | WO-2018036870 A1 | 3/2018 |

OTHER PUBLICATIONS

"3rd Generation Partnership Project; Technical Specification Group Radio Access Network; Evolved Universal Terrestrial Radio Access Network (E-UTRAN); X2 application protocol(X2AP) (Release 15,)," 3GPP Standard, Technical Specification; 3GPP TS36.423, 3rd Generation Partnership Project (3GPP), Mobile Competence Centre, 650, Route Deslucioles, F-06921 Sophia-Antipolis Cedex, France,val. RAN WG3, No. V15.0.0, Jan. 12, 2018 (Jan. 12, 2018),XP051392645, pp. 1-350.

Application and Filing Receipt for U.S. Appl. No. 16/325,814, filed Feb. 2019, Inventor(s): Ghosh et al.

Broadband Forum, "TR-169 EMS to NMS Interface Requirements for Access Nodes Supporting TR-101," Issue: 1.0, Nov. 2008, 50 pages.

Car Wifi, "Fill up your car with the Internet," 4GEE, 11 pages.

Chandrasekharan S., et al., "Designing and Implementing Future Aerial Communication Networks", IEEE Communications Magazine, May 2016, 9 pages.

Combined Search and Examination Report for GB Application No. 1714232.4, dated Feb. 1, 2018, 6 pages.

Combined Search and Examination Report under Section 17 and 18(3) for GB Application No. 1616558.1, dated Mar. 8, 2017, 5 pages.

Combined Search and Examination Report under Sections 17 and 18(3) for GB Application No. 1714237.3, dated Feb. 1, 2018, 5 pages.

Dhenke A., "Extending Cell Tower Coverage Through Drones," Proceedings of the 18th International Workshop, HotMoblie '17, Feb. 21-22, 2017, 6 pages.

European Search Report for Application No. 15275100.4, dated Sep. 10, 2015, 8 pages.

Examination Report under section 18(3) for GB Application No. 1714232.4, dated Jul. 16, 2019, 5 pages.

Extended European Search Report for Application No. 16191547.5, dated Mar. 31, 2017, 14 pages.

Extended European search report for EP Application No. 17189458. 7, dated Mar. 7, 2018, 7 pages.

Extended European search report for EP Application No. 17189459. 5, dated Mar. 7, 2018, 7 pages.

GB Search Report for corresponding GB Application No. GB1614341. 4, dated Feb. 2, 2017, 1 Page.

Han, et al., "Evaluation of Authentication Signaling Loads in 3GPP LTE/SAE Networks," 2009 IEEE, 34th Conference on Local Computer Networks (LCN 2009), Zurich, Switzerland, 978-1-4244-4487-8/09/, 2009 IEEE, Oct. 20-23, 2009, 8 pages.

He, T., et al., "VigilNet: An Integrated Sensor Network System for Energy-Efficient Surveillance," ACM Transactions On Sensor Networks, ACM, 2 Penn Plaza, Suite 701 New York NY 10121-0701 USA, vol. 2 (1), Feb. 2006, pp. 1-38.

Ho, et al., "Evolving Femtocell Coverage Optimization Algorithms using Genetic Programming," Bell Laboratories, Alcatel-Lucent, Swindon, UK, 978-1-4244-5213-4/09/, IEEE 2009, 5 pages.

International Preliminary Report on Patentability for Application No. PCT/EP2016/056353, dated Oct. 3, 2017, 7 pages.

(56) References Cited

OTHER PUBLICATIONS

International Preliminary Report on Patentability for Application No. PCT/EP2017/070690, dated Apr. 11, 2019, 8 pages.
International Preliminary Report on Patentability for Application No. PCT/EP2018/070452, dated Nov. 15, 2019, 16 pages.
International Preliminary Report on Patentability for Application No. PCT/EP2018/070486, dated Mar. 10, 2020, 7 pages.
International Search Report and Written Opinion for Application No. PCT/EP2017/070689, dated Oct. 11, 2017, 10 pages.
International Search Report and Written Opinion for Application No. PCT/EP2017/070690, dated Nov. 23, 2017, 14 pages.
International Search Report and Written Opinion for Application No. PCT/EP2018/070486, dated Oct. 24, 2018, 11 pages.
International Search Report and Written Opinion for International Application No. PCT/EP2019/050677 dated Feb. 19, 2019, 16 pages.
International Search Report for Application No. PCT/EP2016/056353, dated May 30, 2016, 3 pages.
International Search Report for Application No. PCT/EP2018/070452, dated Aug. 24, 2018, 4 pages.
Kolar J.W., et al., "Conceptualization and Multiobjective Optimization of the Electric System of an Airborne Wind Turbine," IEEE Journal of Emerging and Selected Topics in Power Electronics, vol. 1 (2), Jun. 2013, 31 pages.
Lambrou T.P., "Distributed Collaborative Path Planning in Sensor Networks With Multiple Mobile Sensor Nodes," 17th Mediterranean Conference on Control & Automation, Jun. 24-26, 2009, 6 pages.
Letter—Intention to Grant for GB Application No. 1714232.4, dated Oct. 15, 2019, 2 pages.
Shao, Z., et al., "A Rapid and Reliable Disaster Emergency Mobile Communication System via Aerial Ad Hoc BS Networks", Wireless Communications, Networking and Mobile Computing (WICOM), 7th International Conference On, IEEE, Sep. 23, 2011, 4 pages.
Valcarce, A., et al., "Airborne Base Stations for Emergency and Temporary Events," In: Lecture Notes of the Institute for Computer Sciences, Social Informatics and Telecommunications Engineering, Springer, DE, vol. 123, Jun. 27, 2013, 12 pages.
Wang J., et al., "Distributed Antenna Systems for Mobile Communications in High Speed Trains," May 2012, vol. 30, No. 4, 9 pages.
Written Opinion for Application No. PCT/EP2016/056353, dated May 30, 2016, 6 pages.
Written Opinion for Application No. PCT/EP2018/070452, dated Aug. 24, 2018, 7 pages.

CELLULAR TELECOMMUNICATIONS NETWORK

PRIORITY CLAIM

The present application is a National Phase entry of PCT Application No. PCT/EP2018/070486, filed Jul. 27, 2018, which claims priority from patent application Ser. No. 17/189,459.5, filed Sep. 5, 2017, each of which is hereby fully incorporated herein by reference.

TECHNICAL FIELD

The present disclosure relates to a mobile base station in a cellular telecommunications network.

BACKGROUND

Cellular telecommunications networks typically comprise a plurality of base stations which each have a coverage area for communicating with a plurality of User Equipment (UE). Traditionally, a base station is in a fixed geographical location by being installed at a particular site or by being installed on a building. These fixed base stations utilize local (typically wired) power and data communication interfaces to receive electrical power and to connect to a cellular core network (often known as a backhaul).

Modern cellular telecommunications networks also provide mobile base stations. These mobile base stations are of a non-fixed geographical location and may change their location either by self-powered movement or by being installed on a movable vehicle (e.g. a train or car). The mobile base station also has a coverage area for communicating with a plurality of UEs, which is achieved in the same manner as for fixed base stations. The mobile base station's backhaul may be provided by a wired interface, but in many circumstances such wired interfaces are unsuitable. Accordingly, mobile base stations typically have a wireless communications interface for carrying backhaul traffic. These wireless communications interfaces connect to a "donor" base station, and the donor base station's backhaul connection to the cellular core network includes both traffic for its own UEs and traffic for the mobile base station's UEs.

As the mobile base station may move relative to the fixed base stations, such that it may move out of a coverage area of its "serving" donor base station, cellular networking protocols define a handover process such that the mobile base station may disconnect from its serving donor base station and connect to a target donor base station with minimal disruption. This process mirrors the corresponding process for UE handover between a serving and target base station, and the mobile base station therefore includes a subset of UE functionality to support this process.

SUMMARY

According to a first aspect of the disclosure, there is provided a method in a cellular telecommunications network, the cellular telecommunications network including a first and second base station, the first base station having a first interface for communicating with a first cellular core networking node and a second interface for wirelessly communicating with the second base station, the second base station being mobile and having a first interface for wirelessly communicating with the first base station and a second interface for communicating with a User Equipment (UE), wherein the UE's user traffic is transmitted between the first cellular core networking node and the UE via the first and second base stations, the method comprising: determining a first identity of a third base station and a second identity of a fourth base station, wherein an overlap of the third and fourth base stations' respective coverage areas cover a route of the second base station; determining a time of arrival of the second base station within the overlap; determining a first configuration parameter of the third base station and a second configuration parameter of the fourth base station in advance of the second base station's time of arrival; based on the determined first configuration parameter of the third base station, initiating a handover of the second base station to the third base station; and configuring a transmission of the second base station based on the determined second configuration parameter of the fourth base station.

Embodiments of the present disclosure provide the advantage that a mobile base station may configure its transmissions in advance of its arrival at a target donor base station by taking into account the configuration parameters of its future neighboring base stations. This ensures that any UE connected to the mobile base station continues to experience the same or similar Quality of Service (QoS) as the mobile base station is handed over to the target donor base station.

The method may further comprise sending a message to the third base station, in advance of the second base station's time of arrival, requesting a resource. Thus, if it is determined, before the mobile base station's arrival at the target donor base station, that further resources are required to ensure continuity of QoS for a UE of the mobile base station, these resources can be reserved in advance.

The moving base station's second interface for communicating with the UE may be a Wireless Local Area Network (WLAN) interface or a cellular networking interface.

The cellular telecommunications network may further include a fifth base station having a first interface for communicating with a second cellular core networking node and a second interface for wirelessly communicating with the second base station, and the second base station's first interface may have: a first wireless connection to the first base station for transmission of the UE's user traffic between the first cellular core networking node and the UE via the first base station, and a second wireless connection to the fifth base station for transmission of the UE's user traffic between the second cellular core networking node and the UE via the fifth base station, the method may further comprise the steps of: based on the determined configuration parameter of the third base station, determining whether to initiate the handover of the first wireless connection to the third base station.

The mobile base station may therefore maintain a plurality of donor connections (to donor base stations), and the method of the present invention may apply to one or more of these donor connections.

According to a second aspect of the disclosure, there is provided a computer program comprising instructions which, when the program is executed by a computer, cause the computer to carry out the method of the first aspect of the disclosure. The computer program may be stored on a computer-readable data carrier.

According to a third aspect of the disclosure, there is provided a network node for a cellular telecommunications network, the cellular telecommunications network including a first and second base station, the first base station having a first interface for communicating with a first cellular core networking node and a second interface for wirelessly communicating with the second base station, the second base station being mobile and having a first interface for wirelessly communicating with the first base station and a second interface for communicating with a User Equipment (UE), wherein the UE's user traffic is transmitted between the first cellular core networking node and the UE via the first and second base stations; the network node comprising: a transceiver and a processor configured to cooperate to: determine a first identity of a third base station and a second identity of a fourth base station, wherein an overlap of the third and fourth base stations' respective coverage areas cover a route of the second base station; determine a time of arrival of the second base station within the overlap; determine a first configuration parameter of the third base station and a second configuration parameter of the fourth base station in advance of the second base station's time of arrival; based on the determined first configuration parameter of the third base station, initiate a handover of the second base station to the third base station; and configure a transmission of the second base station's first and/or second communications interface based on the determined second configuration parameter of the fourth base station.

The transceiver may be further configured to send a message to the third base station, in advance of the second base station's time of arrival, requesting a resource.

The second base station's second communications interface may be a Wireless Local Area Network (WLAN) interface or a cellular networking interface for communicating with the UE.

The cellular telecommunications network may further include a fifth base station having a first interface for communicating with a second core networking node, and the second base station's first communications interface may have: a first wireless connection to the first base station for transmission of the UE's user traffic between the first cellular core networking node and the UE via the first and second base stations, and a second wireless connection to the fifth base station for transmission of the UE's user traffic between the second cellular core networking node and the UE via the second and fifth base station, the transceiver and the processor may be further configured to cooperate to: based on the determined configuration parameter of the third base station, determining whether to initiate the handover of the first wireless connection to the third base station.

The network node may be the second base station.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
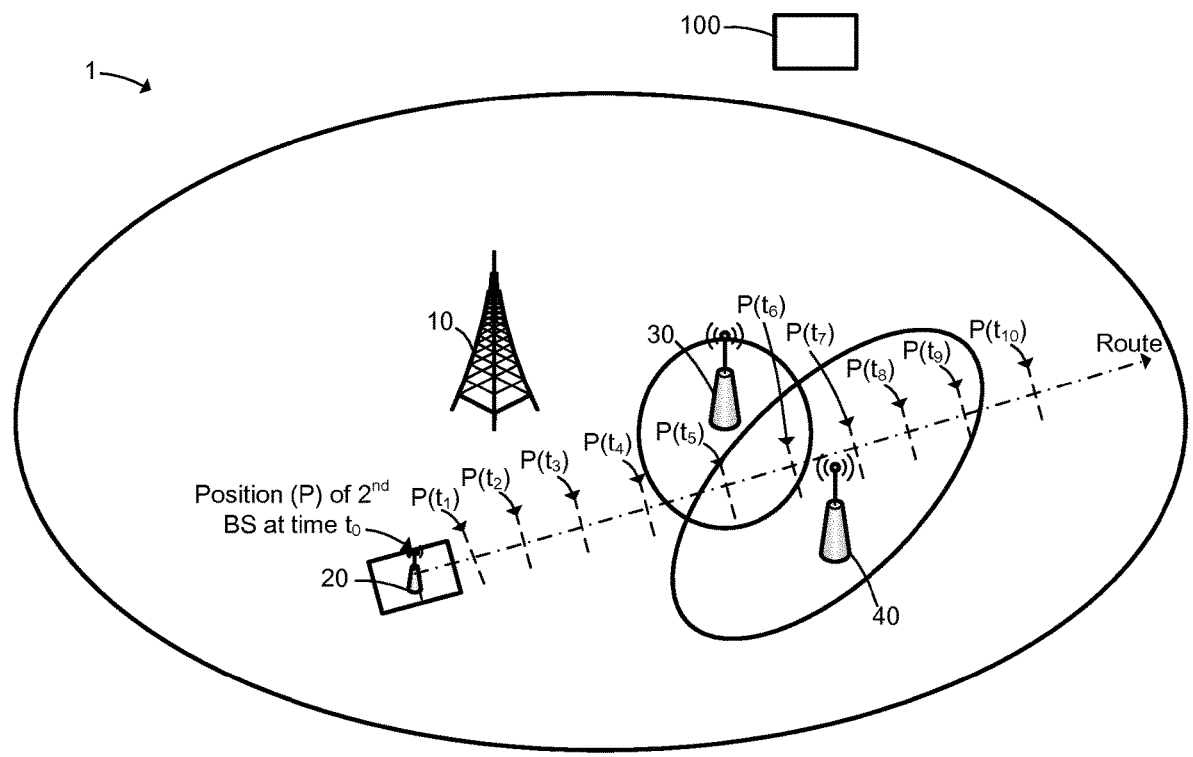
FIG. 1 is a schematic diagram of a first embodiment of a cellular telecommunications network of the present disclosure.

A first embodiment of a cellular telecommunications network 1 will now be described with reference to FIGS. 1 to 2. The cellular telecommunications network 1 includes a first, second, third and fourth base station 10, 20, 30, 40, wherein the first base station 10 is a macro base station and the second, third and fourth base stations are femto base stations. The macro base station therefore has a relatively large coverage area compared to those of the second, third and fourth base stations. The first, third and fourth base stations 10, 30, 40 are of fixed geographical locations whereas the second base station 20 is affixed to a movable train. The second base station's route is shown in FIG. 1, and passes through an overlapping portion of the respective coverage areas of the first, third and fourth base stations 10, 30, 40.

In this embodiment, the cellular network 1 further includes a network resource server 100, which stores the identity (e.g. the enhanced Cell Global Identifier, eCGI), location and coverage area of each base station in the cellular network 1.

FIG. 1 illustrates the cellular network 1 at a first point in time when the second base station 20 has a wireless connection to the first base station 10 (such that the first base station 10 is the second base station's serving "donor" base station). This form of connection, between the mobile base station and its serving donor base station, will hereinafter be known as the "donor connection". The first base station 10 has a wired connection to the core network (not shown) which carries traffic for the User Equipment (UE) of the first base station 10 and, in this scenario, for the UEs of the second base station 20. This form of connection, between the base station and the core network, will hereinafter be known as the "core connection".

Figure 2:
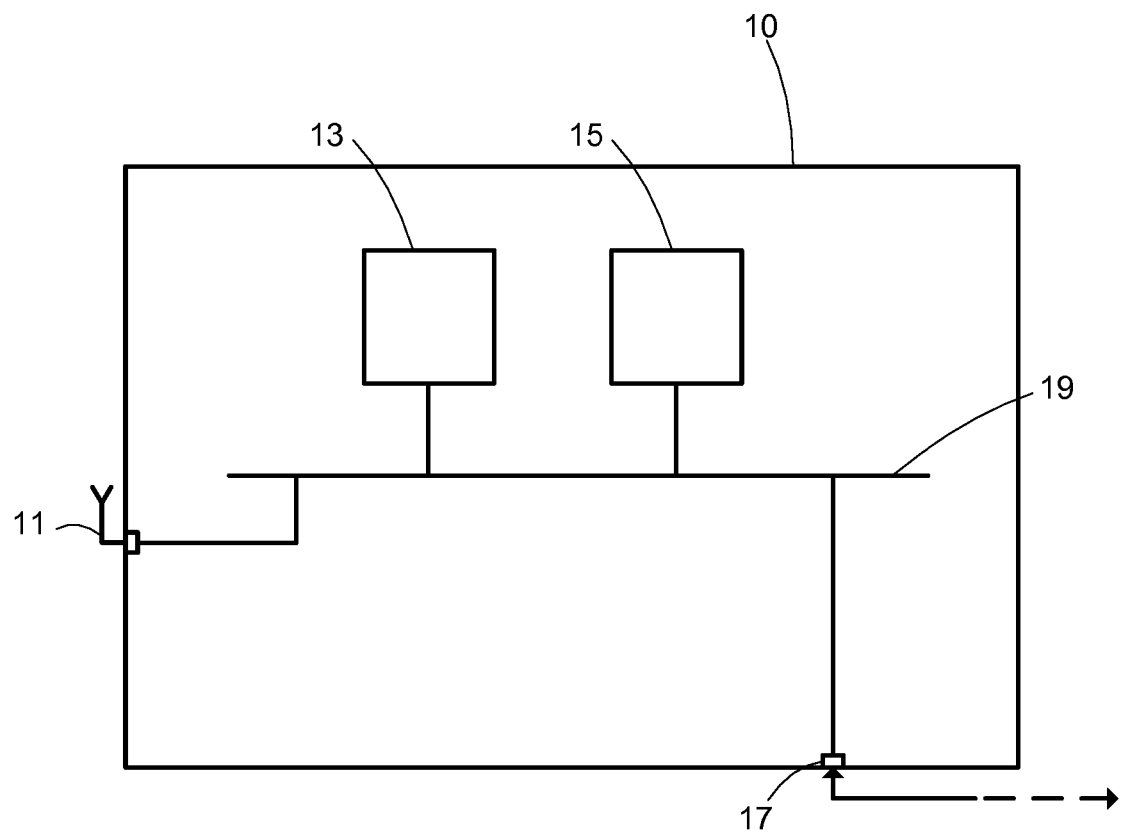
FIG. 2 is a schematic diagram of the first base station of FIG. 1.
Figure 3:
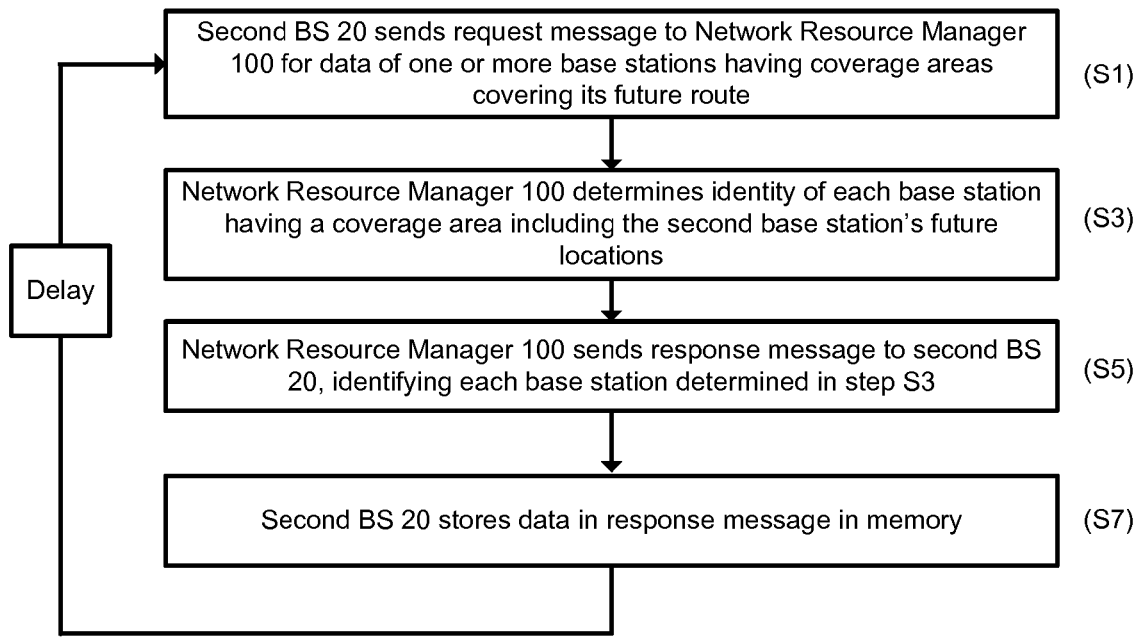
FIG. 3 is a flow diagram of a first process of a first embodiment of a method of the present disclosure.

A schematic diagram of the first base station 10 is illustrated in FIG. 2. The first base station 10 includes a first transceiver 11, a processor 13, memory 15 and a second transceiver 17, all connected via bus 19. The first transceiver 11 is an antenna configured for 1) communication with a plurality of User Equipment (UE) via the Long Term Evolution (LTE) protocol, and 2) forming the donor connection with the second base station 20. The second transceiver 17 is an optical fiber connection, which is used for communicating with one or more cellular core networking entities (including the network resource server 100) via the core connection and/or for communicating with one or more neighboring base stations (e.g. using an X2 message).

The second, third and fourth base stations 20, 30, 40 are similar to the first base station 10, although their components may be adapted for shorter range communications. As noted above, the second base station 20 is a mobile base station (i.e. of a non-fixed geographical location) and therefore further differs from the first base station 10 in that the second transceiver is an antenna for wireless communication (via the donor connection) with a donor base station. In this embodiment, each base station 10, 20, 30, 40 may also communicate (directly or indirectly) with the network resource server 100 via their second transceivers.

A first embodiment of a method of the present disclosure will now be described with reference to FIGS. 1 to 5. In FIG. 1, as noted above, the second base station 20 is affixed to a moving train and is initially in a first position and is served by the first base station 10. FIG. 1 also illustrates the route of the moving train and the coverage areas of each base station, thus showing the overlapping coverage areas of the third and fourth base stations 30, 40 which further cover a part of the moving train's future route.

In a first process of this embodiment (S1 of FIG. 3), the second base station 20 sends a request message to the network resource server 100, including data on its future route and a request for data of one or more base stations having coverage areas which cover the future route. In this embodiment, the second base station 20 creates the data on its future route by estimating its location (in Global Positioning System (GPS) coordinates) upon expiry of a plurality of time intervals (e.g. ten successive one-minute time intervals). The data therefore includes the second base station's estimated GPS coordinates in one-minute's time, the second base station's estimated GPS coordinates in two minutes' time, etc., for the next ten minutes. These locations, and the second base station's time of arrival, $t_n$, at each location, are illustrated in FIG. 1.

The network resource server 100 receives this message and, in S3, determines the identity of each base station having a coverage area including the second base station's location for each time interval. In this example, for time intervals $t_1$ to $t_4$, it is determined that the first base station 10 has a coverage area including the second base station's location at those times; for time intervals $t_5$ and $t_6$, it is determined that the first, third and fourth base stations have coverage areas including the second base station's location at those times; for time intervals $t_7$ to $t_9$, it is determined that the first and third base station have coverage areas including the second base station's location at those times; and for time interval $t_{10}$, it is determined that the first base station has a coverage area including the second base station's location at that time.

In S5, the network resource manager 100 sends a response message to the second base station 20 identifying each base station (by its eCGI) that has a coverage area including its location at each time interval, and including data on the coverage areas of each identified base station.

The second base station 20 receives this data and stores it in memory (S7), and the process loops back to S1 (via a delay timer), such that a new request message is sent to the network resource server 100. The second base station 20 therefore updates its data for its expected locations for the next ten minutes. This iterative loop will therefore address any changes to the second base station's location or any changes in the identified base station's location and/or coverage area.

Figure 4:
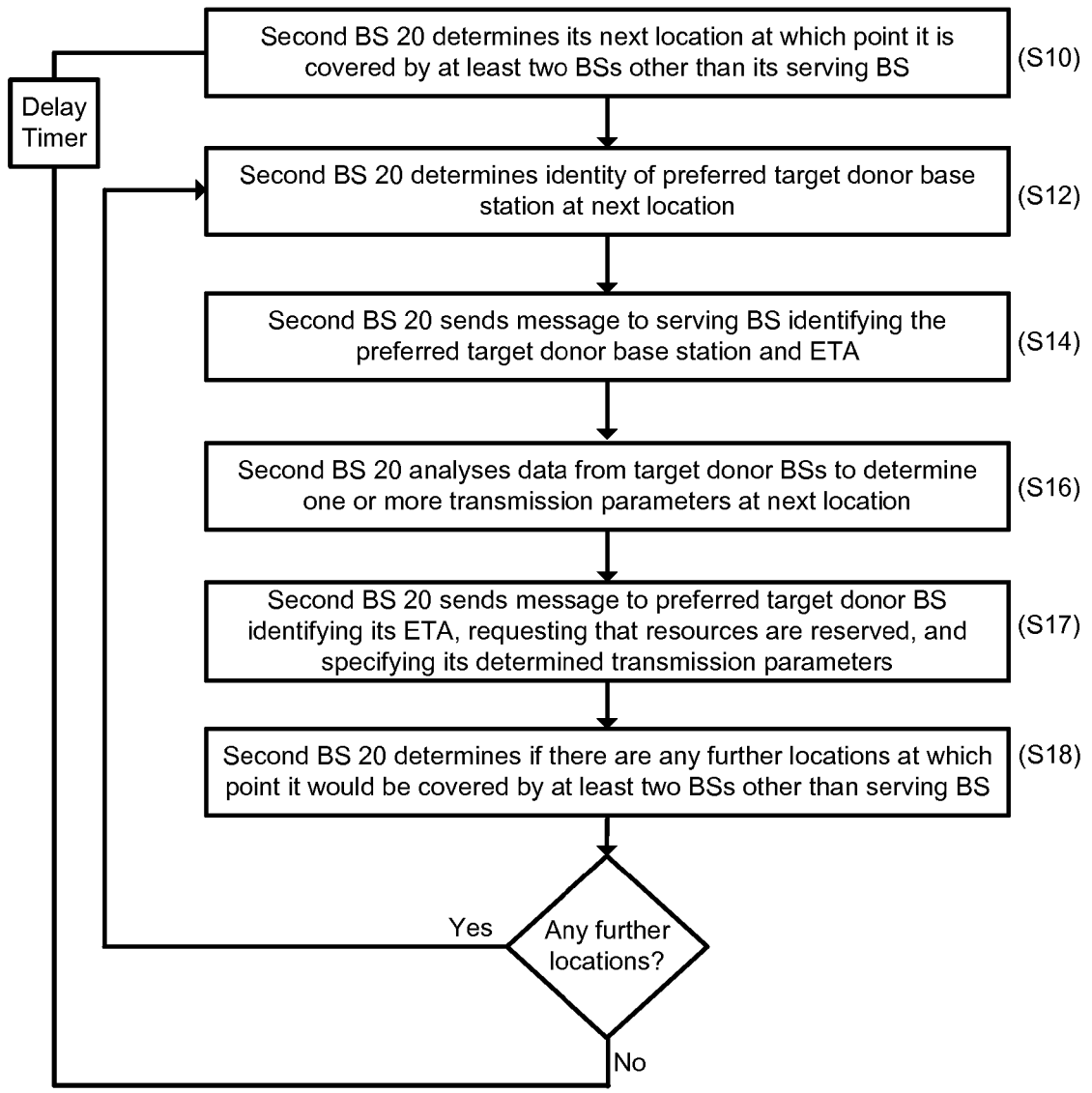
FIG. 4 is a flow diagram of a second process of the first embodiment of the method of the present disclosure.

A second process of this embodiment will now be described with reference to FIG. 4, in which the second base station 20 utilizes the data it receives in the first process. In S10, the second base station 20 determines its next location at which point it would be covered by at least two base stations other than its serving donor base station (the first base station 10). In this embodiment, that is at time $t_5$ when it its location will be covered by the first, third and fourth base stations 10, 30, 40.

In S12, the second base station 20 then determines which of the third and fourth base stations 30, 40 (hereinafter, third and fourth "target" donor base stations) would be its preferred target donor base station if a handover is to occur. This is achieved by the second base station 20 setting up an X2 connection with each of the identified target donor base stations, and sending a request for data on their operating parameters (e.g. its Radio Access Technologies (RATs) used for the donor connection (e.g. LTE, microwave P2P, WiFi), and PCI value) and performance indicators (e.g. its capacity and load information). The target donor base stations respond with this data (which, where appropriate, include current, average and forecast values), and the second base station 20 analyzes each target donor base station's data to determine which would be a more suitable donor connection and is therefore its "preferred" target donor base station. In this embodiment, this analysis is based one or more of the following non-exhaustive list:

Which target donor base station has/will have the greatest capacity;
Which target donor base station has/will have the smallest load;
The target donor base stations' current/forecast energy saving statuses; and
The interference techniques the second base station must implement for each target base station.

The second base station 20 then determines which of the third and fourth base stations 30, 40 is its preferred target donor base station based on this data. In this example, the third base station 30 is selected as the preferred target donor base station. In S14, the second base station 20 sends an information message (e.g. within an RNReconfiguration message) to its serving donor base station (the first base station 10) identifying the third base station 30 as its preferred target donor base station, its estimated time of arrival in the coverage area of that target donor base station, and data regarding its resource requirements (i.e. capacity). On receipt of this information message, the first base station 10 stores this data in memory 15.

In S16, the second base station 20 analyses the data received from each target donor base station to determine one or more transmission configuration parameters for when it arrives at the location, at time $t_5$. These configuration parameters are selected so as to optimize the second base station's performance, and therefore take into account the operating parameters of its preferred target donor base station (the third base station 30) so as to select complimentary parameters for the second base station 20, and further take into account the operating parameters of any other base station which has a coverage area including the second base station's location at that time (i.e. the first and fourth base stations 10, 40) so as to mitigate any negative impact on the second base station's performance. The analysis may result in one or more of the following example configuration parameters:

| Data Analysis | Configuration Parameter |
| --- | --- |
| Second base station 20 has PCI conflict with fourth base station 40 | Non-conflicting PCI |
| Second base station 20 is co-channel with strong overlap with the fourth base station 40 | Use soft frequency reuse with orthogonal high power resources |
| Second base station 20 is co-channel with strong overlap with fourth base station 40, but only for short amount of time | Adapt idle and connected mode mobility parameters to minimise unnecessary ping pong (as overlap is too short term) |
| First base station 10 broadcasts Almost Bblank Subframes (ABS). Second base station 20 and fourth base station 40 will use ABS | Coordinate so that ABS are used effectively |

The second base station then stores the identity of its preferred target donor base station, the timestamp corresponding to its expected time of arrival in the coverage area of the preferred target donor base station, and its configuration parameters if it is handed over to the preferred target donor base station, in memory.

In this embodiment, in S17, the second base station 20 sends a message to the third base station 30 specifying its time of arrival within the coverage area of the third base station 30, specifying what resources the second base station 20 requires if it uses the third base station 30 as a donor base station, and specifying the transmission parameters determined in step S16. The third base station 30 may react to this message by making suitable reconfigurations to accommodate (e.g. by initializing a further radio to increase capacity, or making changes to its own transmission parameters such that they are complimentary to those of the second base station 20).

In S18, the second base station 20 determines if there are any further locations at which point it would be covered by at least two base stations other than its serving base station. In this example, there are no further locations which satisfy this criterion. However, if this determination was positive, then the second base station 20 would loop back to S12 in order to select its preferred target donor base station at that location, to reserve resources at its determined preferred target donor base station when it arrives at that location, and to determine what transmission configuration parameters it should use at that location. Once the second base station determines that there are no further locations at which point it would be covered by at least two base stations other than its serving base station, then the process loops back to S10, via a delay timer. The second base station 20 therefore iteratively updates its serving donor base station with the identity of (and time of arrival at) its preferred target donor base station at its next location (and, if applicable, any further future locations) where it will be covered by at least two other base stations. This, again, accounts for any changes in the target donor base station's operational parameters or performance indicators.

Figure 5:
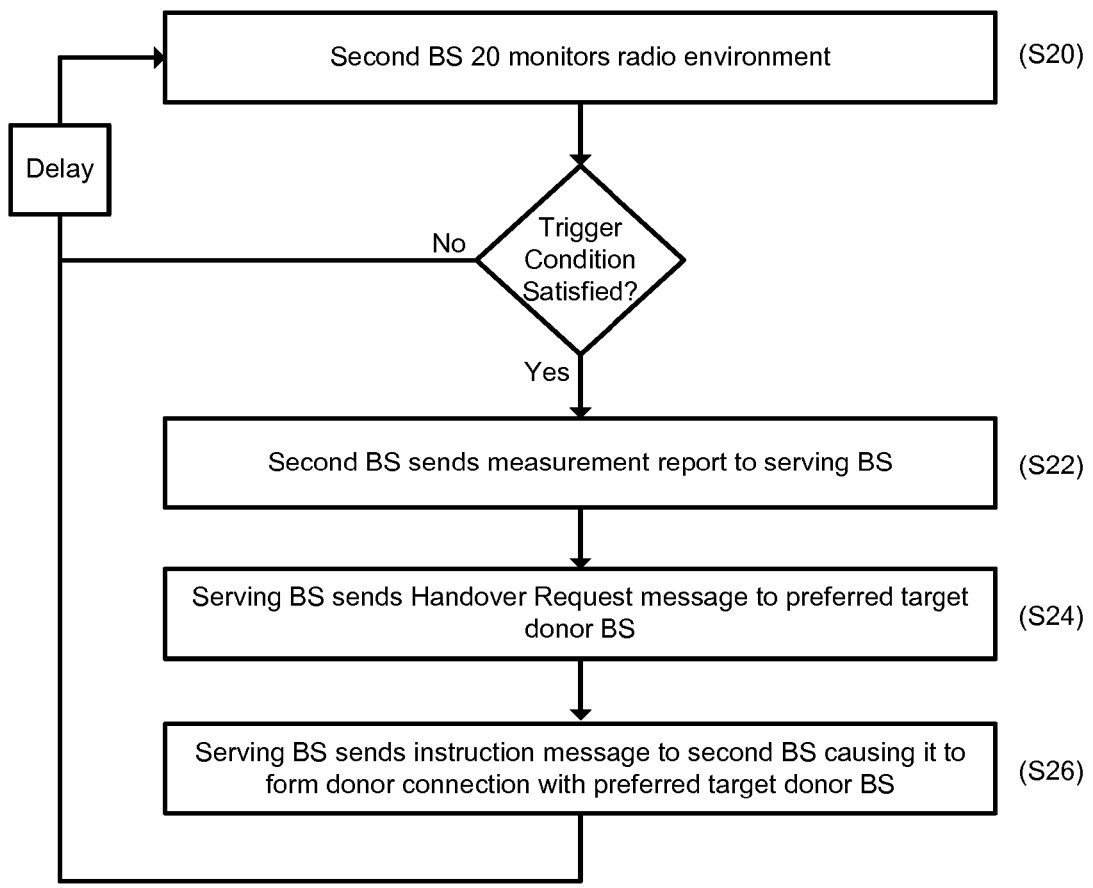
FIG. 5 is a flow diagram of a third process of the first embodiment of the method of the present disclosure.

A third process of this embodiment will now be described with reference to FIG. 5. In S20 of this third process, the second base station 20 monitors its radio environment to determine, for example, the Reference Signal Received Power (RSRP) for all base stations for which it can receive a signal. The second base station 20 then determines whether this data satisfies a trigger condition to initiate a handover from its serving donor base station to a target donor base station (e.g. a target donor base station having a greater RSRP than the serving donor base station). If this condition is not met, then the process loops back (via a delay timer) to be repeated at a later time. However, in this example at time $t_5$, the trigger condition is met and the second base station 20 sends a measurement report (S22) to its serving donor base station (the first base station 10). The measurement report identifies both the third and fourth base stations 30, 40 as potential target donor base stations.

In response, the first base station 10 initiates a handover process. In S24, the first base station 10 determines the identity of the preferred target donor base station. In this example, the preferred target donor base station is the third base station 30. Accordingly, the first base station 10 identifies the third base station 30 as the target of the handover, and sends an X2 Handover Request message to the third base station 30.

Once the first and third base stations 10, 30 have successfully negotiated the handover, the first base station 10 sends (in S26) an instruction message to the second base station 20 to cause it to disconnect from the first base station 10 and connect to the second base station 20. In response, the second base station 20 reconfigures its transmissions based on the stored configuration parameters in memory, and completes the handover to the third base station 30. Accordingly, the second base station 20 is handed over from the first base station 10 to the third base station 30 with its transmissions configured in advance of its arrival to minimize interference with the third base station's neighbors (i.e. the first and fourth base stations 10, 40).

Furthermore, the skilled person will understand that it is not essential for the second base station to perform the above process, but they could instead be calculated by a centralized server (having communication interfaces with base stations in the network, such as the network resource manager).

Figure 6:
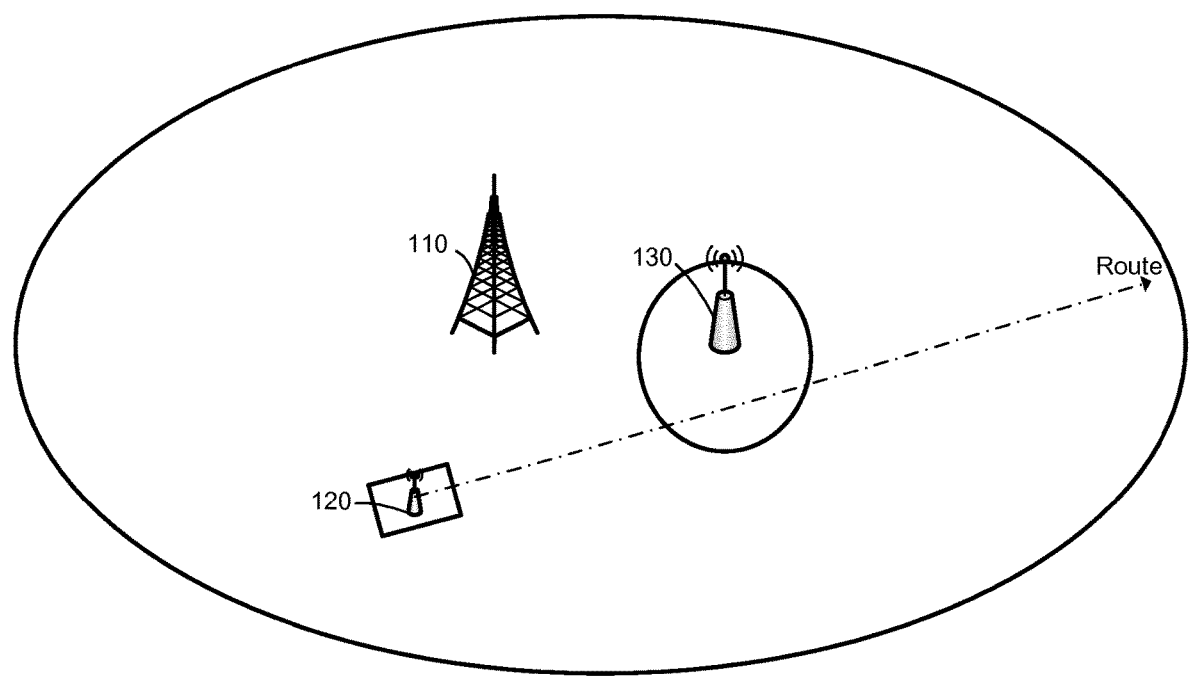
FIG. 6 is a schematic diagram of a second embodiment of a cellular telecommunications network of the present disclosure.
Figure 7:
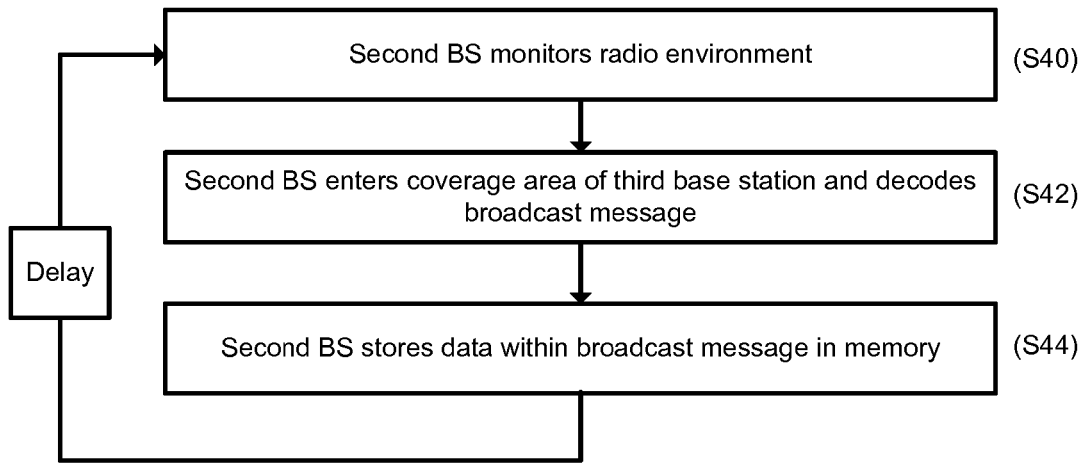
FIG. 7 is a flow diagram of a first process of a second embodiment of a method of the present disclosure.

A second embodiment of the present disclosure will now be described with reference to FIGS. 6, 7 and 8. The network of the second embodiment is substantially similar to that of the first embodiment, but only includes a first, second, and third base station 110, 120, 130, in which the first base station is a fixed macro base station, the second base station is a mobile femto base station, and the third base station is a fixed femto base station. The locations and coverage areas of each base station are illustrated in FIG. 6. In this embodiment, the second base station does not predetermine and reserve resources in advance of its arrival within the coverage area of its future donor base stations. Instead, this second embodiment illustrates an alternative technique in which the donor base stations broadcast their backhaul capabilities and the mobile base station receives and reacts to this broadcast in its preferred donor base station selection process. A first process of this embodiment will now be described with reference to FIG. 7.

In S40, the second base station 20 uses a Network Listen (NL) function, implemented by its processor and first transceiver, to monitor its radio environment. In particular, the second base station 20 monitors frequency bands and RATs that could be used for a donor connection (which may have been identified by its serving donor base station).

In S42, the second base station 20 enters the coverage area of the third base station 30. The NL function identifies the third base station 30 (e.g. by its eCGI) and performs various measurements to prepare a measurement report (e.g. by measuring the Reference Signal Received Power, RSRP). The second base station 20 also decodes the System Information Block (SIB), which, in this embodiment, includes one or more of the following information on the third base station's donor connection capabilities from the following non-exhaustive list:

Its supported RATs and frequency bands;
Its current capacity and loading;
Information on its core connection;
Donor connection preference indicators (e.g. charge related information);
Coverage information (so the second base station 20 can predict how long the third base station 30 may act as a donor base station); and
Contact/Identifying information (e.g. SSID of WLAN RAT).

In S44, the second base station 20 stores this information in its Neighbor Relations Table (NRT) in memory. The process then loops back round to step S40, via a delay timer, such that the second base station 20 periodically performs a new NL function and updates its NRT.

Figure 8:
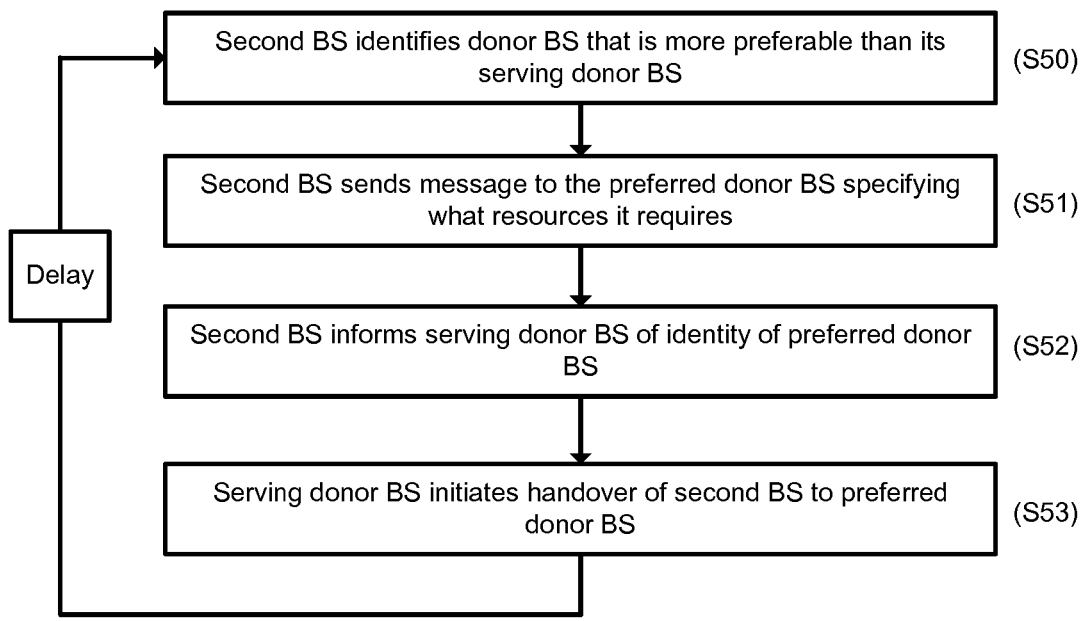
FIG. 8 is a flow diagram of a second process of the second embodiment of the method of the present disclosure.

In a second process, as illustrated in FIG. 8, will now be described. In S50, the second base station 20 determines whether any candidate target donor base station in its NRT is a more preferable donor to its serving donor base station (the first base station 10). The second base station 20 bases this decision, at least in part, on the donor connection information from the SIB message, such as the supported RATs, and capacity and loading information. In this example, the second base station 20 determines that the third base station 30 would provide a better donor connection than the first base station 10.

In this embodiment, in S51, the second base station 20 sends a request message to the third base station 30 specifying what resources the second base station 20 requires. In this embodiment, the second base station 20 sends a request message by establishing a communication channel with the third base station 30 over a WLAN communication interface (e.g. as defined in any one of the 802.11 family of standards, commonly known as "WiFi"), for example by using the SSID in the broadcast information. However, in alternative arrangements, the communication channel may be established via the first base station (e.g. using an X2 message).

The third base station 30 may react to this message by making suitable reconfigurations to accommodate (e.g. by initializing a further radio to increase capacity).

In S52, the second base station 20 informs the first base station 10 of the identity of the target donor base station offering the preferable donor connection (again using the RNReconfiguration message). In this embodiment, in S53, the first base station 10 is configured to react to receipt of an RNReconfiguration message by initiating a handover of the second base station 20 to the identified target donor base station. The first base station 10 sends an X2 Handover Request message to the third base station 30 and, once the handover is successfully negotiated, the first base station 10 sends an instruction message to the second base station 20 causing it to disconnect from the first base station 10 and connect to the third base station 30.

The process then loops back to S50, via a delay timer, and the second base station 20 determines if there are any other candidate target donor base stations in its NRT (which may have been updated following subsequent iterations of the first process, outlined in S40 to S44, as the second base station 20 moves along its route).

In the above embodiments, the handover of the second base station is triggered either by a measurement report satisfying a particular condition, or by the serving donor base station being configured to react to a particular message sent by the second base station when a condition is met. The skilled person will understand that both options are applicable to each embodiment. Furthermore, the second base station may complete a handover to its preferred donor base station in other ways, such as by forming a donor connection with the preferred donor base station before disconnecting from its current serving base station (known as a "make-before-break" handover).

Furthermore, the above embodiments include the second base station monitoring its radio environment (either to determine when a trigger condition has been met or to decode a particular broadcast message). In an enhancement to either embodiment, the second base station may increase the rate at which it performs such monitoring as its connection with the serving base station degrades. For example, the second base station may have a plurality of signal strength thresholds, and the rate of performing each monitoring function may increase when each signal strength threshold is met.

In the above second embodiment, the donor base stations broadcast their donor connection information in a SIB message. This is advantageous as the second base station may determine this information relatively quickly (than the first embodiment in which an X2 connection is set up before the second base station arrives in the target donor base station's coverage area) and the second base station may directly determine particular measurements (e.g. RSRP) rather than determining an estimate. Furthermore, broadcast messages are often relatively robust and easy to decode (e.g. by using standard defined portions of the frame and by using simple modulation schemes), such that base stations can readily decode these messages with minimal processing cost. Nonetheless, the skilled person will understand that any other broadcast message, or a bespoke broadcast message, may be used. Other broadcast messages that may be suitable include the Multimedia Broadcast Multicast Service (MBMS) in LTE and the beacon frame in WiFi.

In both of the above embodiments, the second base station may have a plurality of donor connections (that is, a plurality of donor connections to one donor base station, or a plurality of donor connections to a plurality of donor base stations). Both embodiments may be applied to one or a subset of these donor connections. Accordingly, if a first donor connection is for Voice of Internet Protocol (VoIP) traffic and a second donor connection is for file downloads, then a first target donor base station may be selected for the first donor connection (e.g. if its donor connection capabilities indicate suitably low latency) and a second target donor base station may be selected for the second donor connection (e.g. if it has suitably high capacity). One of these donor connections may remain with the second base station's current serving base station if it has the most suitable characteristics.

In the above embodiments, the second base station configures its transmissions in response to data it receives on several target donor base stations. These may be transmissions both on the first transceiver (i.e. with a UE) and/or on the second transceiver (i.e. with the donor base station).

The skilled person will also understand that it is not essential for the other first, third and fourth base stations to be fixed, as they too could be mobile. The first embodiment above may address issues with data for the target donor mobile base stations becoming inaccurate (e.g. due to the target donor mobile base station having a changeable coverage area) by having a Time-To-Live limit for any associated data.

In the first embodiment above, the second base station sends a request to the network resource manager for data on candidate target donor base stations that cover its future route, and the network resource manager responds with a message identifying each candidate target donor base station and the coverage area of each candidate. In one implementation, the coverage area may be indicated by the GPS coordinates of the candidate target donor base station and a radius measurement of its coverage area. However, more complex network resource maps may be used instead. Furthermore, the skilled person will understand that it is not essential for the network resource manager to respond with data regarding the coverage areas, as the second base station may establish an X2 connection with the candidate target base station (using the identifier from the network resource manager) and request this information from the candidate.

The skilled person will understand that any combination of features is possible within the scope of the invention, as claimed.

The invention claimed is:

1. A method for determining mobile base station handover and transmission parameters in a cellular telecommunications network with overlapping base station coverage areas, the method comprising:

identifying a first target donor base station and a second target donor base station, wherein an overlap of respective coverage areas of the first target donor base station and the second target donor base station covers a route of a mobile base station that has a first interface for wirelessly communicating with a serving donor base station and a second interface for communicating with a User Equipment (UE), wherein the serving donor base station has a first interface for communicating with a first cellular core networking node and a second interface for wirelessly communicating with the mobile base station, and wherein user traffic of the UE is transmitted between the first cellular core networking node and the UE via the serving donor base station and the mobile base station;

determining a time of arrival of the mobile base station within the overlap based on at least one location of the mobile base station along a future route that intersects with the overlap;

determining a configuration parameter of the first target donor base station and a configuration parameter of the second target donor base station in advance of the time of arrival of the mobile base station within the overlap;

based on the determined configuration parameter of the first target donor base station being identified as preferred relative to the determined configuration parameter of the second target donor base station, initiating a handover of the mobile base station to the first target donor base station; and selecting at least one configuration parameter for transmissions by the mobile base station based on the determined configuration parameter of the second target donor base station so as to mitigate interference with the second target donor base station when the mobile base station is served by the first target donor base station.

2. The method as claimed in claim 1, further comprising sending a message to the first target donor base station, in advance of the time of arrival of the mobile base station, requesting a resource.

3. The method as claimed in claim 1, wherein the interface of the mobile base station for communicating with the UE is a Wireless Local Area Network (WLAN) interface.

4. The method as claimed in claim 1, wherein the interface of the mobile base station for communicating with the UE is a cellular networking interface.

5. The method as claimed in claim 1,
wherein the cellular telecommunications network includes a further base station having a first interface for communicating with a second cellular core networking node and a second interface for wirelessly communicating with the mobile base station,
wherein the first interface of the mobile base station has:
a first wireless connection to the serving donor base station for transmission of user traffic of the UE between the first cellular core networking node and the UE via the serving donor base station, and
a second wireless connection to the further base station for transmission of user traffic of the UE between the second cellular core networking node and the UE via the further base station,
and wherein the method further comprises:
based on the determined configuration parameter of the first target donor base station, determining whether to initiate handover of the first wireless connection to the first target donor base station.

6. A computer system comprising:
a processor and memory storing instructions which, when executed by a computer, cause the computer to determine mobile base station handover and transmission parameters in a cellular telecommunications network with overlapping base station coverage areas by:
identifying a first target donor base station and a second target donor base station, wherein an overlap of respective coverage areas of the first target donor base station and the second target donor base station covers a route of a mobile base station that has a first interface for wirelessly communicating with a serving donor base station and a second interface for communicating with a User Equipment (UE), wherein the serving donor base station has a first interface for communicating with a first cellular core networking node and a second interface for wirelessly communicating with the mobile base station, and wherein user traffic of the UE is transmitted between the first cellular core networking node and the UE via the serving donor base station and the mobile base station;
determining a time of arrival of the mobile base station within the overlap based on at least one location of the mobile base station along a future route that intersects with the overlap;
determining a configuration parameter of the first target donor base station and a configuration parameter of the second target donor base station in advance of the time of arrival of the mobile base station within the overlap;
based on the determined configuration parameter of the first target donor base station being identified as preferred relative to the determined configuration parameter of the second target donor base station, initiating a handover of the mobile base station to the first target donor base station; and
selecting at least one configuration parameter for transmissions by the mobile base station based on the determined configuration parameter of the second target donor base station so as to mitigate interference with the second target donor base station when the mobile base station is served by the first target donor base station.

7. A non-transitory computer-readable data carrier having stored thereon a computer program that, when loaded onto and executed by a computer system, causes the computer system to carry out the method of claim 1.

8. A network node for determining mobile base station handover and transmission parameters in a cellular telecommunications network with overlapping base station coverage areas, the network node comprising:
a transceiver and a processor configured to cooperate to:
identify a first target donor base station and a second target donor base station, wherein an overlap of respective coverage areas of the first target donor base station and the second target donor base station covers a route of a mobile base station that has a first interface for wirelessly communicating with a serving donor base station and a second interface for communicating with a User Equipment (UE), wherein the serving donor base station has a first interface for communicating with a first cellular core networking node and a second interface for wirelessly communicating with the mobile base station, and wherein user traffic of the UE is transmitted between the first cellular core networking node and the UE via the serving donor base station and the mobile base station;

determine a time of arrival of the mobile base station within the overlap based on at least one location of the mobile base station along a future route that intersects with the overlap;

determine a configuration parameter of the first target donor base station and a configuration parameter of the second target donor base station in advance of the time of arrival of the mobile base station within the overlap;

based on the determined configuration parameter of the first target donor base station being identified as preferred relative to the determined configuration parameter of the second target donor base station, initiate a handover of the mobile base station to the first target donor base station; and selecting at least one configuration parameter for transmissions by the mobile base station based on the determined configuration parameter of the second target donor base station so as to mitigate interference with the second target donor base station when the mobile base station is served by the first target donor base station.

9. The network node as claimed in claim 8, wherein the transceiver is further configured to send a message to the first target donor base station, in advance of the time of arrival of the mobile base station, requesting a resource.

10. The network node as claimed in claim 8, wherein the second communications interface of the mobile base station is a Wireless Local Area Network (WLAN) interface for communicating with the UE.

11. The network node as claimed in claim 8, wherein the second communications interface of the mobile base station is a cellular networking interface for communicating with the UE.

12. The network node as claimed in claim 8, wherein the cellular telecommunications network includes a further base station having a first interface for communicating with a second core networking node, and the first communications interface of the mobile base station has:
    a first wireless connection to the serving donor base station for transmission of user traffic of the UE between the first cellular core networking node and the UE via the serving donor base station and the mobile base station, and
    a second wireless connection to the further base station for transmission of the user traffic of the UE between the second cellular core networking node and the UE via the mobile base station and the further base station,
    the transceiver and the processor being further configured to cooperate to, based on the determined configuration parameter of the first target donor base station, determine whether to initiate handover of the first wireless connection to the first target donor base station.

13. The network node as claimed in claim 8, wherein the network node is the mobile base station.

* * * * *